J. STOLL.
Corn-Planter.
No. 162,428. Patented April 20, 1875.
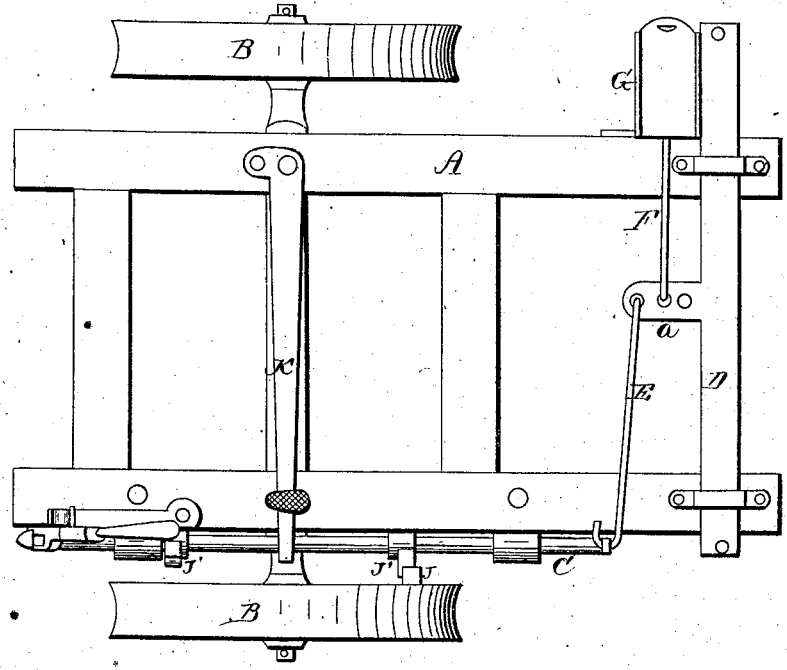
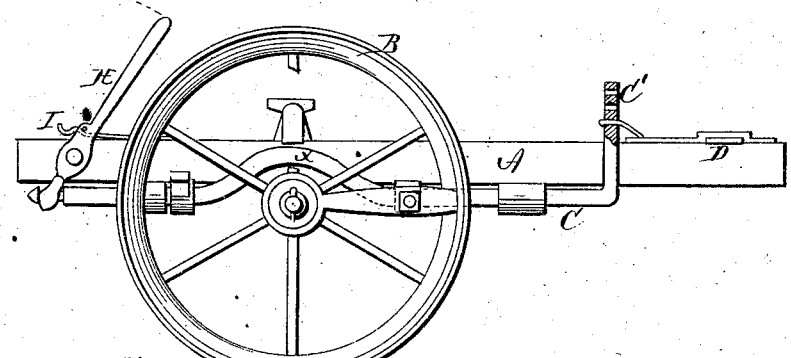
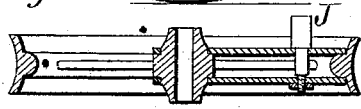
WITNESSES
Henry N. Miller
C. L. Evert
INVENTOR
John Stoll
per
Alexander Mason
Attorneys

UNITED STATES PATENT OFFICE.

JOHN STOLL, OF LINCOLN, ILLINOIS.

IMPROVEMENT IN CORN-PLANTERS.

Specification forming part of Letters Patent No. 162,428, dated April 20, 1875; application filed September 23, 1874.

*To all whom it may concern:*

Be it known that I, JOHN STOLL, of Lincoln, in the county of Logan and in the State of Illinois, have invented certain new and useful Improvements in Check-Rower; and do hereby declare that the following is a full, clear, and exact description thereof, reference being had to the accompanying drawings and to the letters of reference marked thereon, making a part of this specification.

The nature of my invention consists in the construction and arrangement of the several parts of a machine for marking land in which grain is to be planted, the peculiarities of which will be hereinafter set forth.

In the accompanying drawings, making part of this specification, Figure 1 is a plan view; Fig. 2, a side view, and Fig. 3 a section of one of the wheels.

In the figures, A represents a rectangular frame, which is supported upon a suitable axle and two wheels. The wheels are marked B B, and are concave on their peripheries, and provided upon one of their spokes with a lug, J, for the purpose hereinafter set forth. C represents a shaft, which lies against one side of the frame A, and is supported in keepers attached to it. This shaft has a bow or partial crank, X, at or near its center, and a perforated crank-arm, C', at its forward end. D represents a sliding guide-plate, which is held upon the forward end of the frame in suitable loops or keepers. About the center of this plate is an arm or projection, *a*, which is perforated with several holes, into which hook the rods E and F. The rod E connects the guide-plate to the shaft C at its crank end, and the rod F connects it to a stirrer or distributer in a box, G. This box G is secured at one side of the frame, and is intended to hold any colored material different from that of the ground, so that when it is dropped by the mechanism of the machine it will indicate where the seed is to be placed. The box is perforated at its bottom, and the rod F, agitating a suitable stirrer or distributer in the said box, causes the material to mark the earth. The lug J upon the wheel strikes against lugs J' upon the shaft C when said wheel revolves, and causes the shaft to partially rotate backward and forward, and thus moves rod F and the agitator in the box.

It is necessary to use two lugs upon the shaft to give a return motion; but as many may be used upon the wheel as desired, but according to how near or distant the marks are to be made upon the earth.

H represents a lever pivoted to the frame at one end, which is intended to operate the shaft C endwise, and throw its lugs out of gear with those upon the wheel. This lever is held in the position it is placed by means of a spring, I. K represents a spring-bar secured to the top of the frame, which has a tooth on the under side of its loose end, which tooth passes down and catches on one side or the other of the bow in the shaft to stop distribution of the material in the box. I may use a shaft on each side of the frame, and also another box, if desirable.

In using this machine for marking dark ground, I will use a white substance in the box, which may be lime or plaster, or any other suitable substance.

I am aware that a pivoted spring-bar provided with a bow or projection, against which the spokes of the wheel strike for actuating the seed-slide, is not new; hence I do not claim such as my invention.

Having thus fully described my invention, what I claim as new, and desire to secure by Letters Patent, is—

The combination, with the frame A and wheels B, having lug J, of the sliding and partially-rotating shaft C, with bow X, lugs J', perforated crank-arm C', adjustable rod E, sliding plate D, with central projection *a*, rod F, box G, all constructed substantially as set forth.

In testimony that I claim the foregoing I have hereunto set my hand this 29th day of August, 1874.

JOHN STOLL.

Witnesses:
W. MOUNTJOY,
A. C. EDWARDS.